(12) United States Patent
Cochran et al.

(10) Patent No.: US 8,185,663 B2
(45) Date of Patent: May 22, 2012

(54) MIRRORING STORAGE INTERFACE

(75) Inventors: Robert Cochran, Roseville, CA (US);
David Robinson, Loomis, CA (US);
Joseph Algieri, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2507 days.

(21) Appl. No.: 10/844,478

(22) Filed: May 11, 2004

(65) Prior Publication Data

US 2005/0256972 A1   Nov. 17, 2005

(51) Int. Cl.
*G06F 15/16* (2006.01)
(52) U.S. Cl. ........ 709/250; 709/214; 709/249; 714/6.23
(58) Field of Classification Search .................. 709/214, 709/217, 219, 249, 250; 714/7, 6.23
See application file for complete search history.

(56) References Cited

U.S. PATENT DOCUMENTS

| | | | |
|---|---|---|---|
| 5,673,382 A * | 9/1997 | Cannon et al. ............. 714/6 |
| 6,092,085 A | 7/2000 | Keene | |
| 6,144,999 A * | 11/2000 | Khalidi et al. ............. 709/219 |
| 6,163,856 A * | 12/2000 | Dion et al. ............. 714/4.11 |
| 6,175,552 B1 | 1/2001 | Parry et al. | |
| 6,202,071 B1 | 3/2001 | Keene | |
| 6,226,651 B1 | 5/2001 | Masuda et al. | |
| 6,266,784 B1 | 7/2001 | Hsiao et al. | |
| 6,493,729 B2 | 12/2002 | Gusler et al. | |
| 6,496,941 B1 | 12/2002 | Segal et al. | |
| 6,502,162 B2 | 12/2002 | Blumenau et al. | |
| 6,502,205 B1 * | 12/2002 | Yanai et al. ............. 714/7 |
| 7,096,269 B2 * | 8/2006 | Yamagami ............. 709/229 |
| 7,539,745 B1 * | 5/2009 | Wang et al. ............. 709/224 |
| 7,620,984 B2 * | 11/2009 | Kallahalla et al. ............. 726/22 |

FOREIGN PATENT DOCUMENTS

JP         11-154110 JP        6/1999

* cited by examiner

Primary Examiner — Frantz Jean

(57) ABSTRACT

A mirroring device includes an interface capable of coupling a primary storage array and a secondary storage array to a network. The interface further includes a logic that monitors traffic for a network packet destined for the primary storage array and selectively identifies a storage array write operation and associated data in the network packet, constructs a network packet targeted to the secondary storage array, and transmits the packet to the primary storage array and the secondary storage array.

47 Claims, 13 Drawing Sheets

MIRRORING STORAGE INTERFACE

BACKGROUND OF THE INVENTION

Maintenance of multiple copies of data is part of the security function in data processing operations in case data is unavailable, damaged, or lost. Institutional users of data processing systems commonly maintain quantities of highly important information and expend large amounts of time and money to protect data against unavailability resulting from disaster or catastrophe. One class of techniques for maintaining redundant data copies is termed mirroring, in which data processing system users maintain copies of valuable information on-site on a removable storage media or in a secondary mirrored storage site positioned locally or remotely. Remote mirroring off-site but within a metropolitan distance, for example up to about 200 kilometers, protects against local disasters including fire, power outages, or theft. Remote mirroring over geographic distances of hundreds of kilometers is useful for protecting against catastrophes such as earthquakes, tornadoes, hurricanes, floods, and the like. Many data processing systems employ multiple levels of redundancy to protect data, positioned at multiple geographic distances.

One of the challenges in management of large database and storage networks is maintenance and growth of connectivity to an amorphous fabric structure that is constantly changing, adding more capacity, modifying capabilities, and addressing failures that can occur at any point in the system. Current disk mirroring technology generally employs dedicated Fibre Channel (FC) or Enterprise Systems Connection (ESCON) links between storage arrays, with all the restrictions and limitations imposed by and inherent to FC and ESCON.

SUMMARY

What is desired is a system and operating methods that increase the flexibility of data storage and protection of data.

According to various embodiments, a mirroring device includes an interface capable of coupling a primary storage array and a secondary storage array to a network. The interface further includes a logic that monitors traffic for a network packet destined for the primary storage array and selectively identifies a storage array write operation and associated data in the network packet, constructs a network packet targeted to the secondary storage array, and transmits the packet to the primary storage array and the secondary storage array.

BRIEF DESCRIPTION OF THE DRAWINGS

Embodiments of the invention relating to both structure and method of operation, may best be understood by referring to the following description and accompanying drawings.

DETAILED DESCRIPTION

Figure 1:
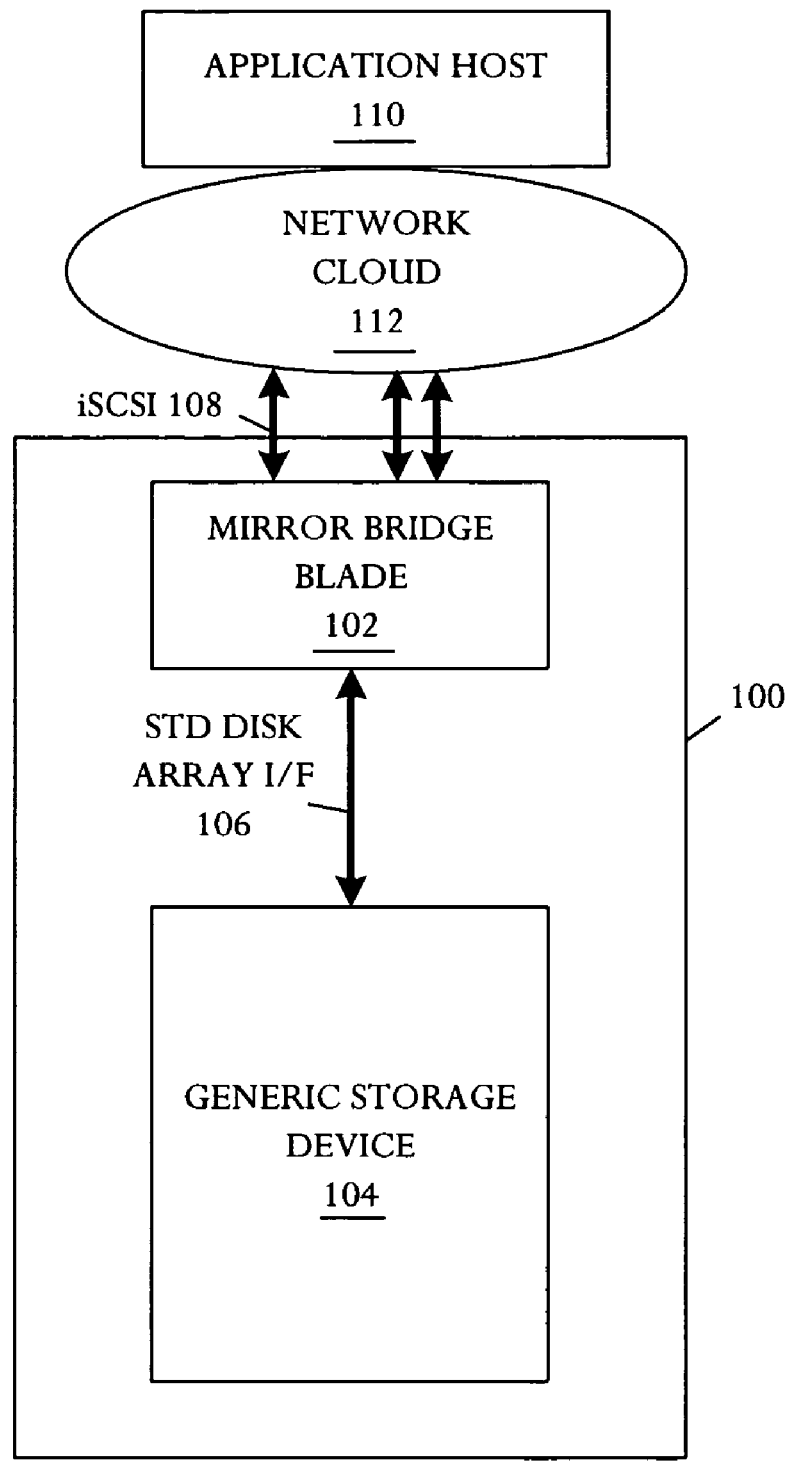
FIG. 1 is a schematic block diagram depicting an embodiment of a storage system capable of transparently mirroring data between generic data storage devices.

Referring to FIG. 1, a schematic block diagram depicts an embodiment of a storage system 100 that includes a mirroring device 102. The mirroring device 102 includes an interface 106 capable of coupling a primary storage array and a secondary storage array to a network. The interface 106 further includes a logic, for example processors 202A, B, and C shown in FIG. 2, that monitors traffic for a network packet destined for the primary storage array and selectively identifies a storage array write operation and associated data in the network packet, constructs a network packet targeted to the secondary storage array, and transmits the packet to the primary storage array and the secondary storage array.

The storage system 100 has a capability to transparently mirror data between generic data storage devices 104. For example, the mirror bridge blade 102 can transparently pass through network traffic and replicate specifically selected traffic based on destination address. The mirror bridge blade 102 can thus function as a data stream replicator that replicates data without virtualization and regardless of storage array characteristics and addressing.

The illustrative storage system 100 comprises a plurality of storage devices 104 that are capable of intercommunication and a mirror bridge blade 102 coupled to the plurality of storage devices 104 by a storage array interface 106. In the specific illustrative embodiment, the storage system 100 can be implemented with a plurality of disk arrays. The storage devices 104 can be Just a Bunch of Disks (JBOD) or other generic storage devices, Redundant Array of Inexpensive Disk (RAID) storage configurations of various types, and other configurations. For example, some storage systems can include various types of disk arrays and/or tape arrays or cartridge arrays. The mirror bridge blade 102 communicates locally, for example within a data center depicted within the storage system 100, via Fibre Channel or other standard disk array interfaces, such as Infiniband, Small Computer Systems Interface (SCSI), Internet SCSI (iSCSI), Enterprise Systems Connection (ESCON), and other interfaces. The storage system 100 communicates through a network cloud 112 with remote devices, such as other storage arrays, communication centers, computers, or networks. FIG. 1 shows the storage system 100 communicating through the network cloud 112 to an application host 110.

The mirror bridge blade 102 resides between the network cloud 112 and the storage device 104, and can reside internal to a storage device or within a host chassis in combination with a storage device. The mirror bridge blade 102 enables auto-mirroring of data volumes within and between heterogeneous and disparate types of storage devices, for example including various types of storage disks and/or tapes, using the flexibility of iSCSI and Internet Protocol Version 6 (IPv6) to perform operations such as transparent, per write input/output (I/O) volume mirroring and support for "fuzzy" mirrors. The mirror bridge blade 102 can perform block-by-block replication between disparate array times and/or device types. The mirror bridge blade 102 can receive the network packet according to a first protocol and selectively converting to a second protocol for transmission. The mirror bridge blade 102 enables a storage system 100 to replace and greatly increase system capabilities in comparison to conventional internal and remote mirroring array firmware used in generic host bus adapters.

Figure 2:
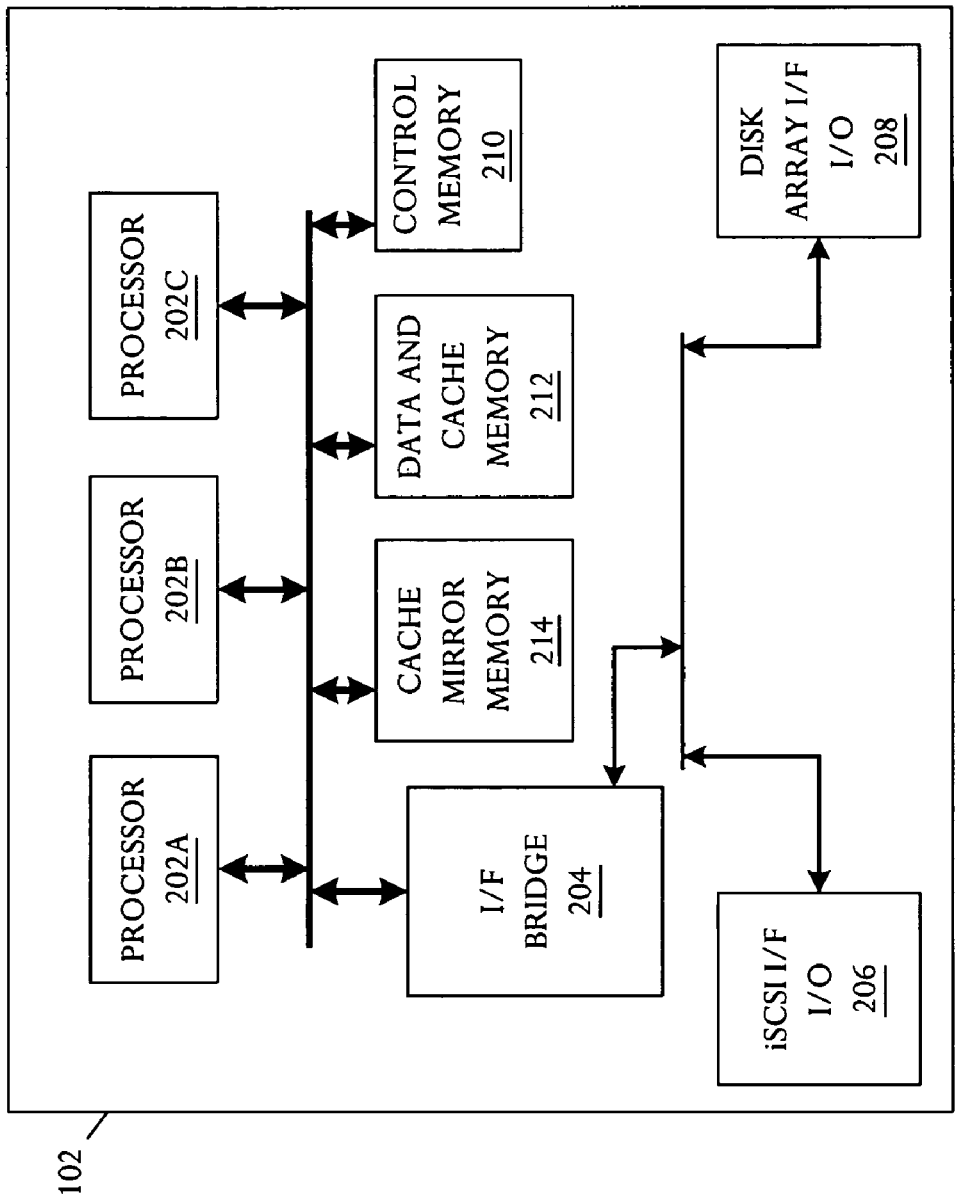
FIG. 2 is a schematic block diagram showing an embodiment of a mirroring device that can be used in a storage system.

Referring to FIG. 2 in combination with FIG. 1, a schematic block diagram shows an embodiment of a mirror bridge blade 102 that can be used in a storage system such as the storage system 100 shown in FIG. 1. The mirror bridge blade 102 further comprises a bridge 204 that interfaces between first 206 and second 208 communication interfaces and at least one controller 202A, 202B, 202C. The communication interfaces 206 and 208 can communicate with storage devices including heterogeneous and disparate storage devices and include the plurality of storage devices 104 internal to a data center, for example within the system 100, and storage devices remote from the data center. The controller 202A, 202B, 202C is coupled to the bridge 204 and can transparently, per write input/output, mirror of information volumes within and between the storage devices 104 and storage devices remote to a data center.

The mirror bridge blade 102 is a blade server, generally defined as a thin, modular electronic circuit board that contains at least one processor 202A, 202B, 202C and memory, for example control memory 210, data and cache memory 212, and a cache mirror memory 214. The mirror bridge blade 102 is typically used for a single, dedicated application, for example communicating data and mirroring data among storage arrays, and usually has form, size, and configuration that facilitate insertion into a space-saving rack or chassis with blades having similar or dissimilar functionality. Multiple blades inserted into a chassis generally share a common high-speed bus are usually designed to produce limited heat to save energy as well as space costs. A blade server is normally used for high density applications and used in clustered configurations with other servers that perform a similar task. Blade servers often include load balancing and failover functionality. The processors 202A, 202B, 202C commonly execute an operating system and application programs that are dedicated and on-board.

The one or more processors 202A, 202B, 202C execute processes, methods, or procedures that facilitate and enable mirroring operations. One process that can be included is an input/output utility that accepts and passes through normal, nonmirrored, read and write requests based on a wide variety of generic storage device addressing protocols, for example World Wide Name (WWN), Target, Logical Unit Number (LUN), track, sector, and the like.

In some embodiments, the mirror bridge blade 102 can be programmed in-band to mirror, as well as pass through, write operations directed at selected address (address-X) traffic to also be transferred to a second selected address (address Y), and optionally to additional addresses. The transfer to multiple addresses can result in either an internal mirror or an external mirror.

The memory 210, processors 202A, 202B, 202C, cache 212 and 214, and executable processes are configured to execute synchronous and asynchronous mirroring to one or many internal and/or external mirror sites. For example, the mirror bridge blade 102 can function as an interceptor for synchronous mirroring that controls traffic flow and a monitor for asynchronous mirroring that replicates and passes traffic transparently.

The mirror bridge blade 102 utilizes a full range of iSCSI IPv6 features including unicast, multicast, anycast, Gig-E (or 10Gig-E) trunking, IPSec encryption, Virtual Local Area Network (VLAN) for grouping and zoning, frame depolarization to attain timely delivery, and others. Internet Small Computer System Interface (iSCSI) is an Internet Protocol (IP)-based storage networking standard for linking data storage facilities. The iSCSI capability to carry SCSI commands over IP networks facilitates data transfer over intranets and storage management over long distances. The iSCSI capabilities increase storage data transmission performance, thereby improving the capabilities in configurations such as storage area networks. With widespread usage of IP networks, iSCSI can be used to transmit data over local area networks (LANs), wide area networks (WANs), metropolitan area networks (MANs), and the Internet and enable location-dependent data storage and retrieval.

For example, the mirror bridge blade 102 can use Differentiated Services (DiffServ or DS) as a protocol for specifying and controlling network traffic by group or class so that selected types of traffic receive precedence. For example, synchronous mirroring traffic, which has a relatively uninterrupted flow of data, may be granted precedence over other kinds of traffic. DS is an advanced method for managing traffic in terms of Class of Service (CoS). DS does not rely on simple priority tagging and deposits more complex policy or rule statements to determine how to forward a particular network packet. For a particular set of packet travel rules, a packet is given one of 64 possible forwarding behaviors. A six-bit field designates a Differentiated Services Code Point (DSCP) in the Internet Protocol (IP) header specifies the behavior for a flow of packets. DS and CoS enable flexible and highly scaleable traffic control.

Multiprotocol Label Switching (MPLS) can be implemented by the mirror bridge blade 102 to accelerate network traffic flow and facilitate traffic management. MPLS enables a controller to set up a particular path for a sequence of packets identified by a label inserted in each packet, saving time for a router to find the address to the next node for packet forwarding. MPLS operates with Internet Protocol (IP), Asynchronous Transport Mode (ATM), and frame relay network protocols. With reference to a standard Open Systems Interconnection (OSI) model, MPLS enables packet forwarding at layer 2, switching, level rather than layer 3, routing, level. MPLS not only moves traffic more rapidly but also facilitates network management for quality of service (QoS).

Zoning is a method of arranging network-communicating devices into logical groups over the physical configuration of the network. Zoning can be performed by switching processes or methods that are executable in the mirror bridge blade 102. Zones can include server nodes, storage nodes, and other switches in the network. In the illustrative embodiments, the zones can include primary and mirror nodes communicating via the network cloud 112. Types of zoning include hard zoning, soft zoning, and a combination of hard and soft zoning. Hard zoning designates usage of a physical switch port address and is most useful in static environments with unchanging connections. Soft zoning defines usage of World Wide Names (WN) and is most beneficial in dynamic network environments such as the network cloud 112 that allows a device to be moved from one node to another without affecting membership in a zone.

In conformance with the iSCSI standard, a request by a user or application causes an operating system to generate appropriate SCSI commands and a data request, that are encapsulated and, if enabled, encryption. The operating system adds a packet header to the encapsulated IP packets and transmits the combination over an Internet connection. A received packet is decrypted, if previously encrypted, and disassembled, separating the SCSI commands and request. SCSI commands are sent to a SCSI controller and to a SCSI storage device. The protocol can be used to return data in response to a request since iSCSI is bidirectional.

Usage of iSCSI communication improves flexibility over Fibre Channel over Internet Protocol (FC/IP) techniques because FC/IP can only be used in conjunction with Fibre Channel technology. In comparison, iSCSI can run over existing Ethernet networks.

Internet Protocol Version 6 (IPv6) is a recent level of the Internet Protocol. Internet Protocol (IP) is a method or protocol sent from one computer to another on the Internet. Each computer connected to the internet has at least one IP address for unique identification from all other internet-connected computers. When a computer sends or receives data, such as an email message or Web page, the message is divided into packets containing addresses of both the sender and receiver. Any packet is first sent to a gateway computer that reads the destination address and forwards the packet to an adjacent gateway, a process that continues sequentially until a gateway recognizes the packet as belonging to a computer in the immediate domain and forwards the packet directly to the computer.

Division of messages into packets and independent transmission of the packets results in packets of one message that can travel by different routes and arrive at various times, and thus in a variable order. The Internet Protocol merely sends the message and another protocol, the Transmission Control Protocol (TCP), arranges the packets in a correct order. IP is a connectionless protocol so that no continuing connection exists between end points.

IPv6 improves the Internet Protocol most noticeably by lengthening IP addresses from 32 to 128 bits, greatly expanding the capacity for growth. Other improvements of IPv6 include specification of options in an extension to the header that is examined only at the destination, thus accelerating overall network performance. IPv6 introduces 'anycast' addressing to enable sending a message to the nearest of several possible gateway hosts that can manage the forwarding of the packet to the others. Anycast messages can be used to update routing tables along the route. IPv6 enables packets to be identified as being part of a particular flow so that packets in a multimedia presentation for arrival in real-time can be supplied at a higher quality-of-service relative to other customers. IPv6 has a header that includes extensions allowing a packet to specify a mechanism for authenticating origin, ensuring data integrity and privacy.

IPv6 describes rules for three types of addressing including unicast from one host to another host, anycast from one host to the nearest of multiple hosts, and multicast from one host to multiple hosts.

IPv6 supports multicast over IP, communication between a single sender and multiple receivers on a network. Typical uses include updating of mobile personnel from a home office and periodic issuance of online newsletters. Multicast is supported through wireless data networks as part of Cellular Digital Packet Data (CDPD) technology. Multicast is used for programming on MBone, a system allowing users at high bandwidth points on the internet to receive live video and sound programming. MBone uses a specific high-bandwidth subset of the Internet and uses a protocol enabling signals to be encapsulated as TCP/IP packets when passing through parts of the Internet that cannot handle multicast protocol directly.

Anycast communication between a single sender and the nearest of several receivers in a group enables one host to initiate efficient updating of router tables for a group of hosts. IPv6 can determine which gateway host is nearest and sends the packets to the nearest host as though using unicast communication. The procedure is repeated in sequence to other hosts in the group until all routing tables are updated.

Link aggregation or trunking is standardized in IEEE 802.3ad and enables higher bandwidth usage of multiple connections between Gigabit Ethernet switches or between a switch and an end device such as a file server. Link aggregation is an accepted standard that allows customers to allocate bandwidth by application requirement and scale the network over time. As additional storage applications are introduced, additional aggregated links can be connected to avoid a congested or blocking architecture.

Internet Protocol Security (IPSec) is a standard for security at the network or packet processing layer of network communication. IPSec is useful for implementing virtual privacy networks and remote user access through dial-up connection to private networks. IPSec enables security arrangements without requiring changes to individual user computers. IPSec supports Authentication Header (AH) and Encapsulating Security Payload (ESP) techniques. AH enables authentication of the data sender. ESP both authenticates the sender and performs data encryption. Specific information associated with AH and ESP is inserted into the packet in a header that follows the IP packet header.

The mirror bridge blade 102 facilitates security capabilities. For example, the mirror bridge blade 102 in a receiving node can authenticate the sender and/or the data contents. The mirror bridge blade 102 in a sending node can send data in either encrypted or non-encrypted form and can, if desired, confine writes to a pre-defined Virtual Local Area Network (VLAN) group. The mirror bridge blade 102 enables data to be encrypted before the data is sent to the storage arrays 104.

Virtual or logical Local Area Network (VLAN) maps hosts on a basis other than geographical location, for example by department, user type, primary application, and the like. VLAN controller can change or add hosts and manage load balancing and bandwidth allocation more easily than LAN based on location. Network management software tracks the relationship of the virtual picture of the LAN with the actual physical picture.

Frame prioritization uses the Ethernet frame field for VLAN tagging to establish priority of delivery of frames within switched Ethernet. Frame prioritization can be used to give priority to mission critical operations such as remote storage mirroring.

The mirror bridge blade 102 can use and be imbedded in standard storage devices that can be either similar or dissimilar. Various suitable storage devices 104 can include Just a Bunch of Disks (JBODs), Redundant Arrays of Inexpensive Disks (RAID) of various types, arrays, and the like. The mirror bridge blade 102 can operate in conjunction with existing Target and Logical Unit (LUN) disk volumes defined within JBODs or RAID arrays, so that virtualizing storage is not required.

Usage of IPv6 by the mirror bridge blade 102 can enable 2-N Site Mirroring and Disaster Recovery that is not constrained by traditional array fan-in and fan-out restrictions. The mirror bridge blade 102 supports data store/forward operations to enable cascaded or multi-cast Disaster Recovery configurations. Usage of IPv6 by the mirror bridge blade 102 enables anycast fuzzy mirrors that do not acknowledge writes and intercommunication among mirror bridge blades of different storage systems or at different data centers or sites. The intercommunication enables systems to correct for missing sequenced updates.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

Figure 3:
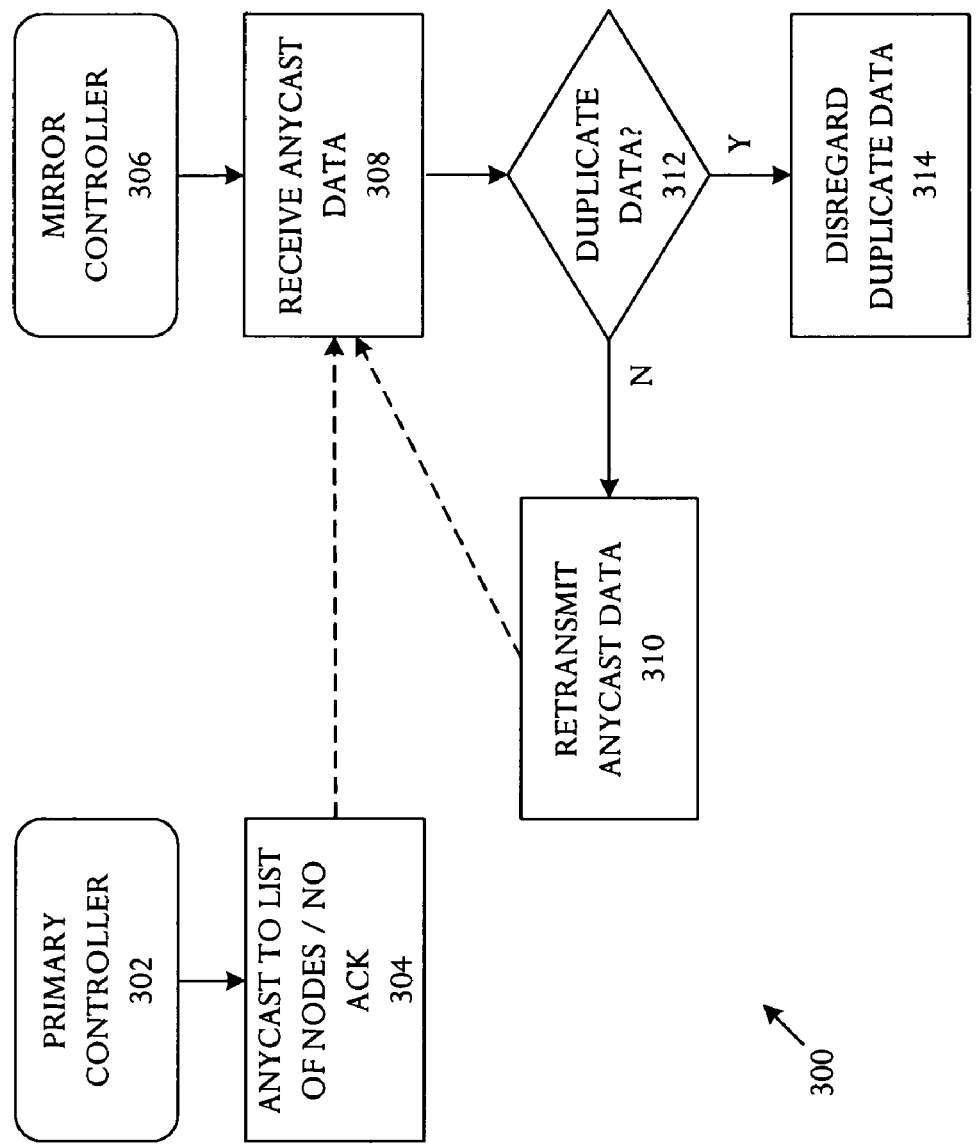
FIGS. 3 and 4 are schematic flow diagrams that show embodiments of processes or methods that are executable a processor of the mirroring device for implementing anycast fuzzy data recovery mirrors.

Referring to FIG. 3, a schematic flow diagram shows an embodiment of a process or method that is executable a processor 202A, 202B, 202C of the mirror bridge blade 102. The process controls anycast fuzzy data recovery mirrors 300. The controller, when operating as a primary node controller 302, anycasts data to a predetermined list of nodes capable of receiving the anycast mirrored data 304 with acknowledgement of the receiving nodes being untracked. A controller operating as a mirror node controller 306 receives the anycast data 308 and sends an identical transmission to other mirror nodes 310 in the predetermined list of nodes. A mirror node controller that receives multiple copies of the transmission 312 disregards the duplicate 314.

Anycast mirroring is highly flexible in comparison to conventional mirroring configurations that are controlled and deterministic, and burden a sender with tracking of a receiver. The mirror bridge blade 102 and anycast fuzzy data recovery mirrors 300 enable anycast mirroring of data to a list of possible receiving nodes, possibly in a VLAN group with selected characteristics or properties, without burdening the sending node with responsibility to await or note acknowledgement of each mirrored write to every receiving mirrored device.

In various implementations, a storage system 100 can configure an IPv6 anycast communication with one or more selected properties or characteristics. In some implementations, all mirrors in a mirror group can deterministically receive each write, generally at about the same time. In other implementations, only the geographically closest mirror receives the write and then multicasts or unicasts the identical write to the remainder of the mirror group. Any mirror group member that receives a duplicate write, as identified by a sequence number, disregards the duplicate.

Figure 4:
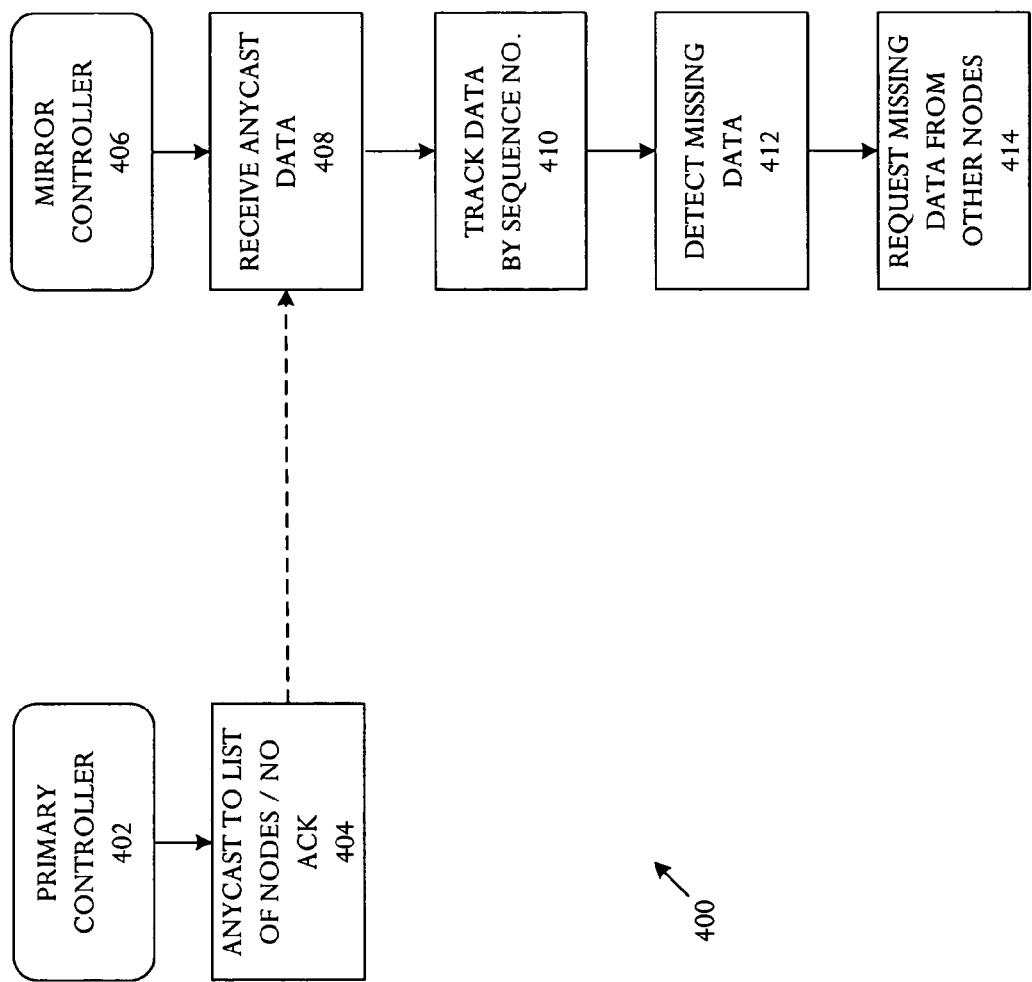

Referring to FIG. 4, a schematic flow chart illustrates another embodiment of process or method that is executable by the mirror bridge blade 102 for controlling anycast fuzzy data recovery mirrors 400. The controller 202A, 202B, 202C, when operating as a primary node controller 402, anycasts data 404 to a predetermined list of nodes that are capable of receiving the anycast mirrored data. Again, acknowledgement of the receiving nodes is not tracked by the anycasting controller. The controller 202A, 202B, 202C, when operating as a mirror node controller 406, receives the anycast data 408 and tracks the received data by sequence number identification 410. The mirror node controller 406 detects missing data according to sequence number 412 and requests missing data 414 from other nodes in the predetermined list of receiving nodes.

If an anycast recipient lacks a particular write, for example due to a loss in transmission, to resolve write ordering according to sequence number, the recipient can confer among peer sites or nodes, without disturbing the anycast sender, to request a missing update.

In the event that a primary volume is lost and a recovery volume is required, a primary node can send an anycast message to a mirror group requesting recovery data. The anycast message typically requests a report from all nodes in the mirror group to report on status regarding a designated volume identifier X. In turn, the mirror devices that remain active and participating return information, for example including World Wide Name (WWN), designation of whether the copy of data identified by volume identifier Vol ID X is consistent or unusable, and designation of the last, in order, addition to the record according to sequence number. The returned information can be used to determine the mirror devices that contain the latest usable version of the record and the geographically closest of the mirror devices with appropriate data. In various embodiments, the determination can be made by a failover process executable in the mirror bridge blade 102 or manually by a user.

Figure 5:
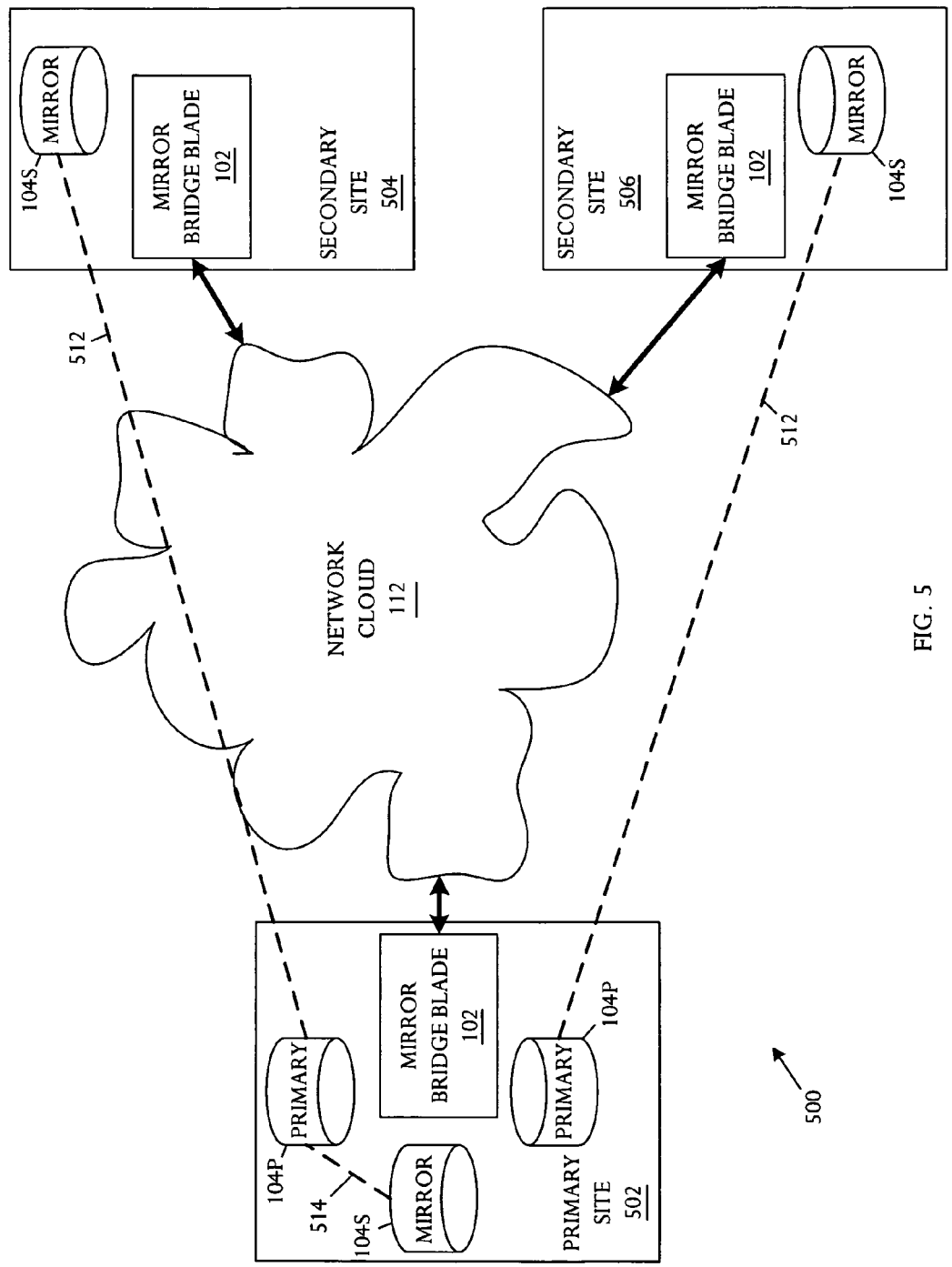
FIG. 5 is a schematic block diagram illustrating an example of a method for mirroring separate data sets using the mirroring device.

Referring to FIG. 5, a schematic block diagram illustrates an example of a method for mirroring separate data sets 500 using the mirror bridge blade 102 to communicate data via the iSCSI IPv6 LAN/WAN/MAN network cloud 112. The network cloud 112 does not support Fibre Channel (FC) so that FC encapsulation can be avoided, enabling flexible 'fuzzy' data recovery mirroring. Separate mirror volumes 500 using a 1-to-1 storage device fan-out is commonly used for data migration or simple data mirroring in contrast to more demanding disaster recovery application that generally move higher data capacities at desired high data rates. Storage devices 104 at a primary site 502 are mirrored in separate data sets to secondary sites 504 and 506 using synchronous or asynchronous data replication between arrays. The system can simultaneously replicate traffic to multiple destinations. The mirror bridge blade 102 can perform block-by-block data replication between disparate array types and even disparate device types, such as various magnetic or optical disk storage drives and/or tape storage devices or cassettes. The mirror bridge blade 102 perform simple data copy operations using a unicast method with the individual array primary 104P and mirror 104S pairs associating with only a 1-to-1 storage device fan-out. The illustration does not show the application host connection to the primary production site mirror bridge blade 102 via the network cloud 112.

The mirror bridge blade 102 can transparently create volume mirrors either within a storage device or production site, for example internal mirror copy 514 in primary site 502, or across storage devices, for example via remote copy 512 to remote or secondary sites 504 and 506.

The mirror bridge blade 102 performs the mirroring operations transparently so that the storage devices 104 simply perform standard read and write operations with no special mirroring procedures or even internal "awareness" that a mirroring operation is taking place.

The term storage device 104 is a generic device and not limited to a particular type of device, such as a disk array. Any appropriate type of storage device can be used including various types of magnetic disk drives, tape drives, CD or DVD-ROM drives with a write capability, and the like.

Figure 6:
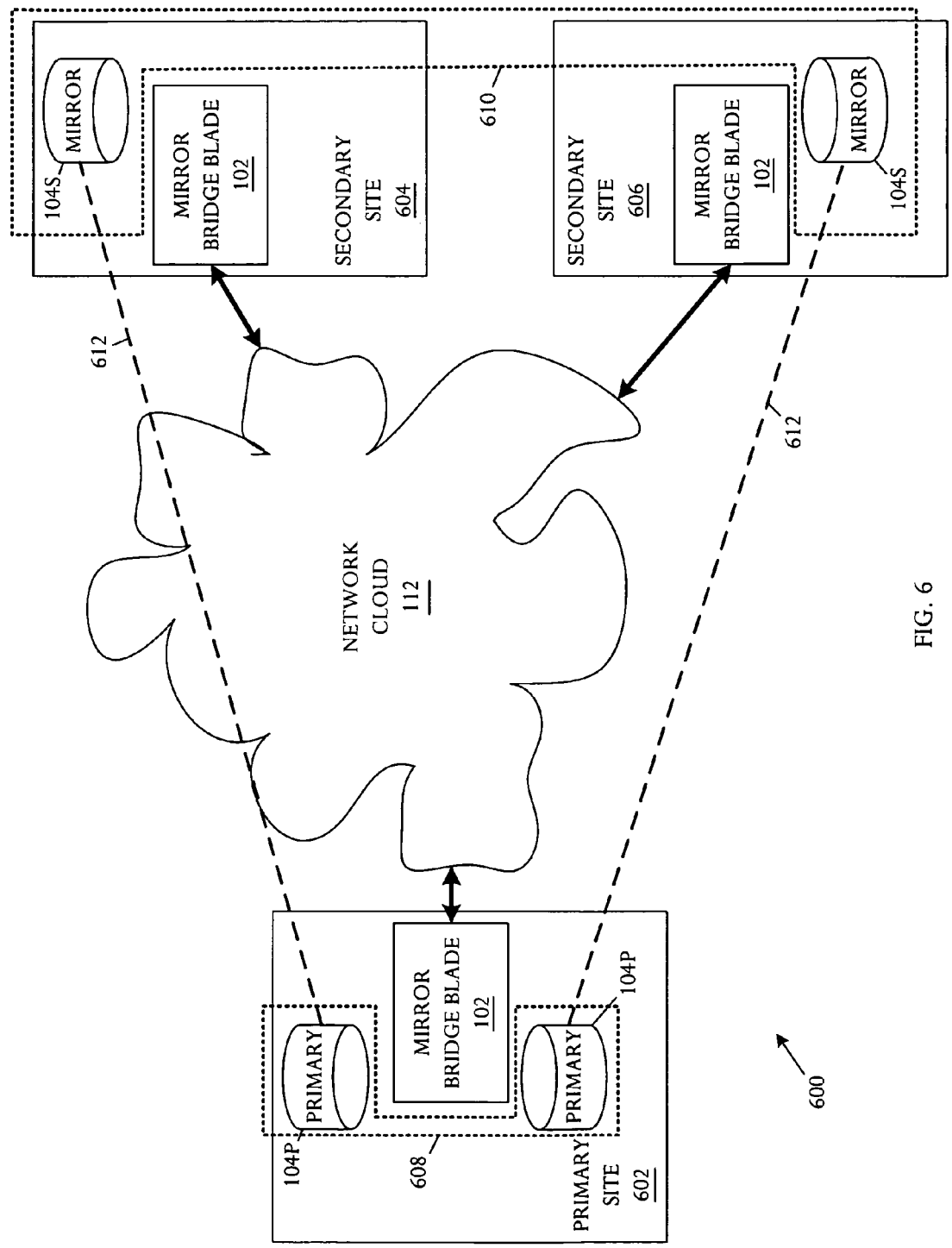
FIG. 6 is a schematic block diagram that shows an example of the usage of the mirroring device in an aggregated mirror volume configuration.

Referring to FIG. 6, a schematic block diagram shows an example of the usage of the mirror bridge blade 102 in an aggregated mirror volume configuration 600. The mirror bridge blade 102 can control mirroring operations to aggregate volumes on mirror sites, shown as an aggregated mirror 610 on remote sites 604 and 606, although not the primary site 602 to create a 1-to-N configuration. On the primary site 602, the storage array devices 104P are managed as one data set 608. The mirror bridge blade 102 mirrors the aggregated volume data set across all N arrays by asynchronous and/or synchronous data replication, 1-to-N volumes per data set and 1-to-N per array. Aggregated data replication 600 utilizes unicast addressing.

Aggregated volume groups 610 that span remote mirror bridge blades 102 are prone to data consistency violations. Accordingly, the sending mirror bridge blade 102 discontinues mirroring to all remote mirror bridge blades 102 once any remote mirror bridge blade write fails to complete.

Figure 7:
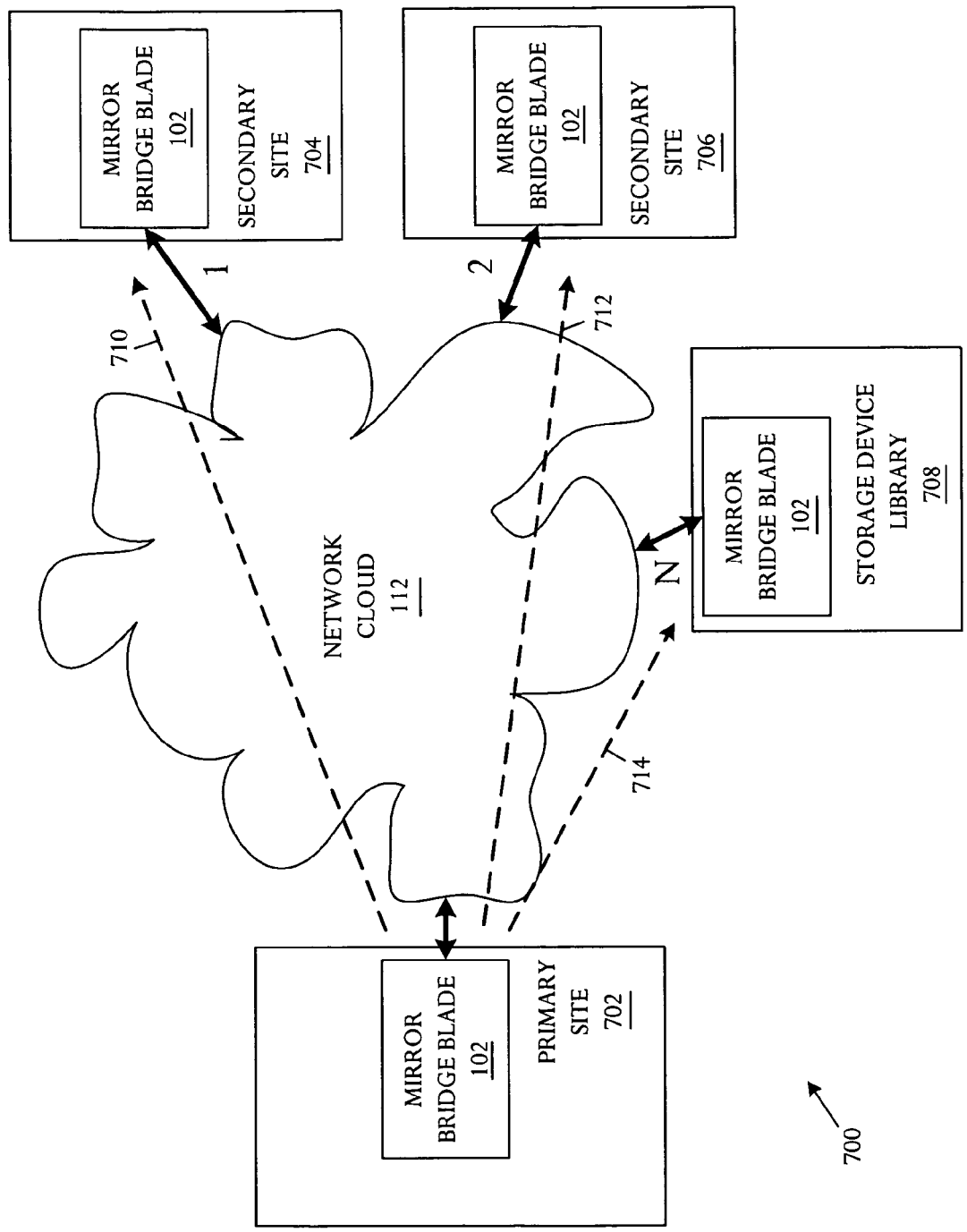
FIG. 7 is a schematic block diagram that shows an example of a technique for sending data in an N-site disaster recovery configuration.

Referring to FIG. 7, a schematic block diagram shows an example of a technique for sending data in an N-site disaster recovery configuration 700. In a 1-to-N unicast or multicast method of sending data in the N-site disaster recovery configuration 700, the mirror bridge blade 102 at primary or production site 1 702 sends data to each other site 704, 706, and additional sites, for example including an Nth site storage device 708. Data is transferred either one at a time using unicast addressing or all at once using multicast addressing. The mirror bridge blade 102 using unicast addressing sends duplicate writes, one at a time, either synchronously or asynchronously, to each remote mirror bridge blade 102. The mirror bridge blade 102 using multicast addressing sends the same write to every remote mirror bridge blade 102, asynchronously or synchronously, at one time. The mirror bridge blade 102 using anycast addressing sends a write to a mirror group in the network cloud 112 without awaiting or tracking acknowledgements of receipt. Fuzzy mirror methods are usable in the N-site disaster recovery configuration 700 when anycast addressing is used. The data replication can be synchronous, for example when data transfer can occur within 25 milliseconds (ms) of host tolerances, or asynchronously.

For applications that emphasize enterprise-level Disaster Recovery, mirror bridge blade 102 can be used to perform various processes or techniques for arrangements in various configurations. In the illustrative configuration, one host write can be duplicated multiple (N) times. In the unicast and/or multicast configuration, the number of storage devices represented by N depends on the host tolerance for response time and the distances, and infrastructure, between the sites.

For example, if a host application requires that any write input/output (I/O) operation completes in 25 ms, then the size N and the distances between sites is adjusted to accommodate the appropriate time budget. For example, modern Fibre Channel switches or Dense Wave Division Multiplexing (DWDM) can pass a signal through, port-to-port, in a few microseconds. Other infrastructure devises such as older Internet Protocol (IP) routers may use up to 10 ms for each node.

The N-site disaster recovery configuration 700 burdens the sending mirror bridge blade 102 more than other cascading or multiple-hop methods, but is not subject to single-point-of-failure difficulties at the mirror side. A first (1) communication 710 is typically sent over metropolitan distances to site-2 704. In many cases, the second (2) communication 712 to site-3 706 is likely to be a much further distance from the primary site 702 to allow for continued operation even in case of an event of large destruction radius. In some examples, site 3 706 or larger can be a last-chance recovery site.

The illustrative Nth communication 714 transfers data from the primary site 702 to a tape library 708.

Figure 8:
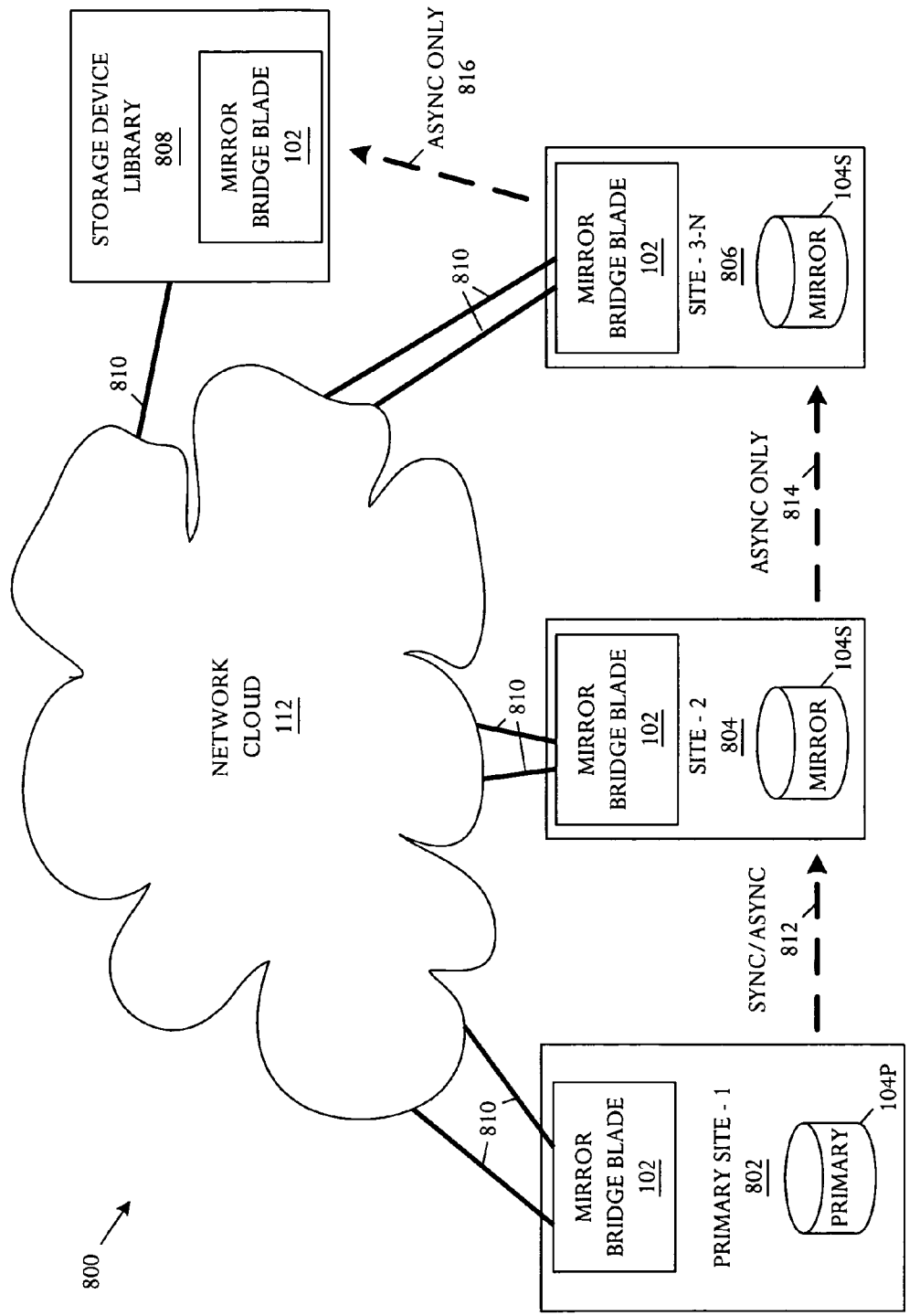
FIG. 8 is a schematic block diagram depicting an example of a cascaded method of transferring data in a disaster recovery configuration.

Referring to FIG. 8, a schematic block diagram depicts an example of a cascaded method of transferring data in a disaster recovery configuration 800. In a separate disaster recover volumes configuration 800 with 1-to-1 storage device fan-out, a cascaded or multiple-hop method reduces the burden, since a mirror bridge blade 102 sends data updates to only one destination site rather than to multiple sites. A drawback of the cascaded configuration 800 is the possibility of single-point-of-failure vulnerability so that all sites beyond a failing site are disabled in the event of failure.

In the cascaded configuration, a primary production site 1 802 sends by synchronous or asynchronous data replication and unicast addressing 812 to a second site 804. In a typical embodiment, site 2 804 is a first-choice disaster recovery site that is a metropolitan distance, for example 20 to approximately 200 kilometers (km) from the primary site 1 802. Site 2 804 forwards data to site 3 806 and so on in a sequence of N sites. Transmission from site 2 804 to site 3 806, and from site 3 806 and to additional sites in sequence to site N, is via asynchronous only communication and unicast addressing 814. Data cascades to a last-chance disaster recovery site N that may be remotely removed geographically from site 1 802, possibly across the country. Data can also be sent from the site N using asynchronous communication and unicast addressing 816 to a storage device 808 such as a tape library.

The illustrative cascaded disaster recovery configuration 800 uses only unicast communication between any two sites.

The mirror bridge blade 102 communicate with the network cloud 112 using iSCSI IPv6 LAN/MAN/WAN protocols 810 with pure SCSI over IP and no Fibre Channel. Trunking techniques, such as Gig-E or 10Gig-E, are also supported for communicating between the mirror bridge blades 102 and the network cloud 112, and can be particularly useful in the cascaded configuration 800 to improve bandwidth over long distances.

Figure 9:
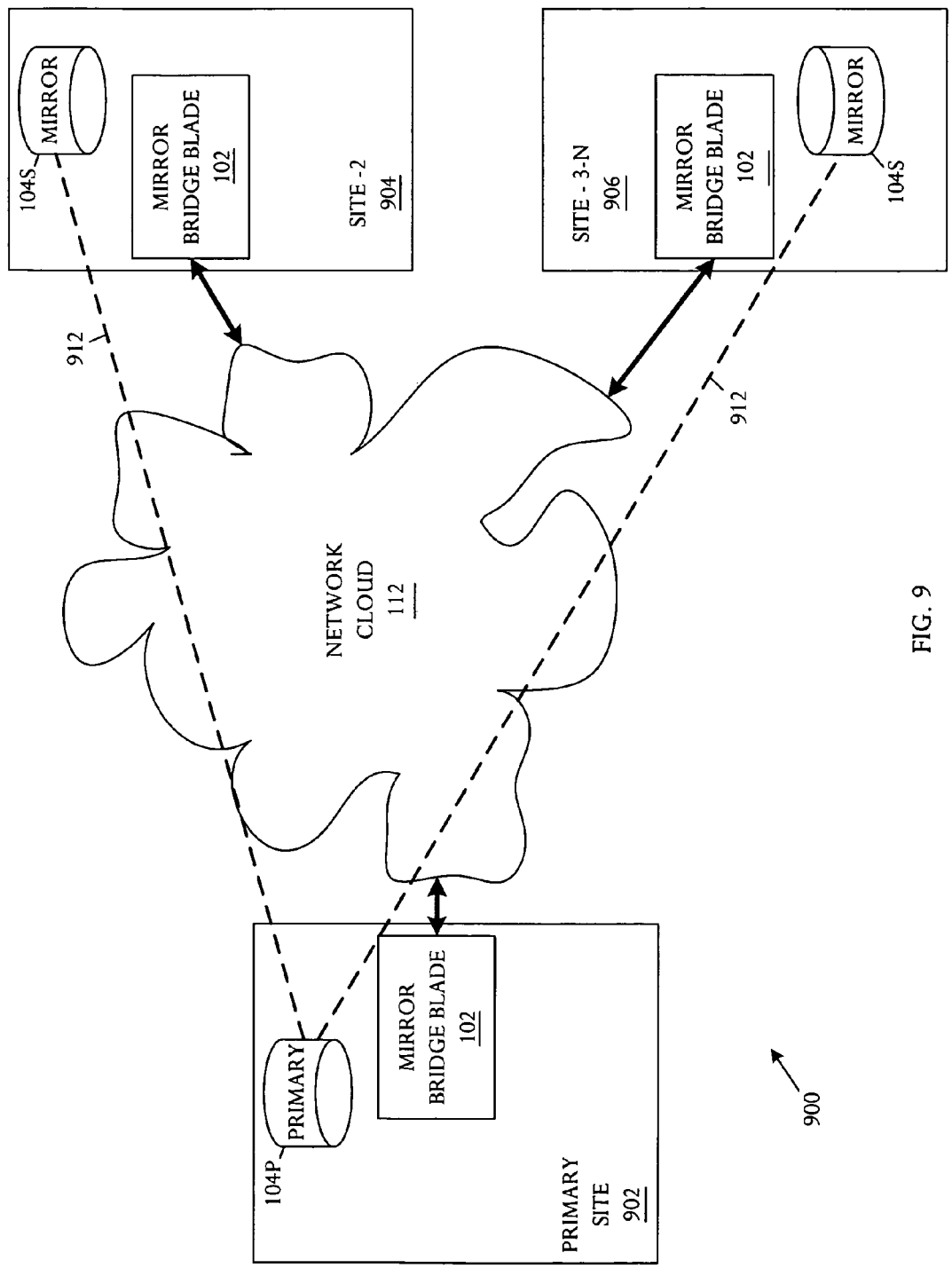
FIG. 9 is a schematic block diagram showing an embodiment of a disaster recover configuration that uses separate disaster recovery volumes with 1-to-N storage device fan-out.

Referring to FIG. 9, a schematic block diagram shows an embodiment of a disaster recover configuration that uses separate disaster recovery volumes with 1-to-N storage device fan-out 900. Data is replicated from a single primary storage device 104P in the primary production site 1 902 to mirror devices 104S in multiple disaster recovery sites 904, 906. In the illustrative example, site-2 904 can be a first-choice disaster recovery site, and higher numbered sites 906 can be assigned a lesser priority, such as a last-chance priority. In the disaster recovery configuration 900, the mirror bridge blade 102 sends identical data across all N arrays using synchronous or asynchronous data replication 912 and either unicast or multicast addressing.

Aggregated volume groups that span remote mirror bridge blades 102 are prone to data consistency difficulties. Therefore the sending mirror bridge blade 102 in the primary site 902 terminates mirroring to all remote mirror bridge blades 102 at the moment any remote mirror bridge blade 102 write operation fails to complete.

Figure 10A:
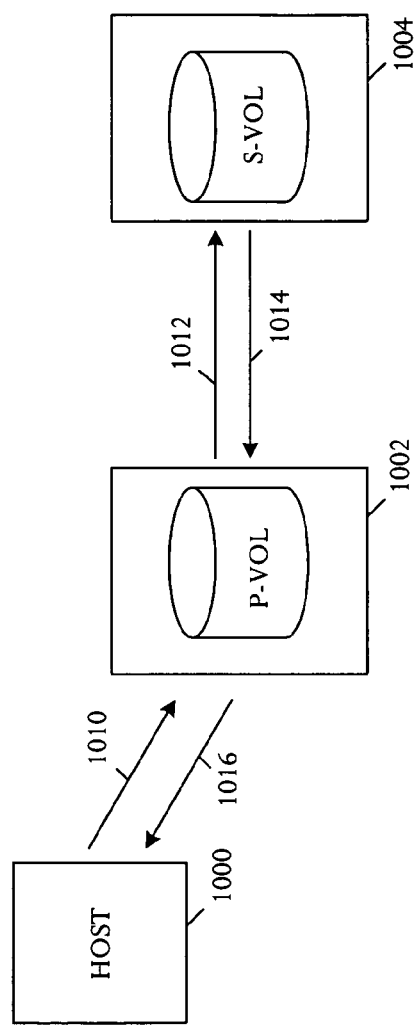
FIGS. 10A and 10B are schematic block diagrams respectively showing synchronous and asynchronous data replication techniques that are compatible with the illustrative method for preserving logical object integrity in a remote mirror cache.

Referring to FIG. 10A, a schematic block diagram illustrates a synchronous data replication method. Any input/output commands 1010 issued to a primary storage array 1002 from a host 1000 are copied 1012 to a secondary storage array 1004. Once data is written in memory on the secondary array 1004, the input/output is acknowledged 1014 to the primary array 1002 and then acknowledged 1016 to the host 1000. In a particular embodiment, a main control unit performs a write operation on a primary volume, starts the update copy operation on the secondary volume, and reports final ending status to a host only after results of the update copy operation are known. If either the primary volume write or the secondary volume update copy operation fails, the main control unit reports a unit check, and the host system and application program regard the write operation to the primary volume as failed. The method for preserving logical object integrity in a remote mirror cache prevents the secondary volume from containing inconsistent or incorrect data.

The illustrative example depicts a two-site data replication and is similarly extended to additional replication sites. In a two-site data replication method, the host application is responsible for data integrity. Because an input/output command is only acknowledged to the application 1016 when written to both arrays 1002 and 1004, the application only issues the next input/output command once the first command is complete so that data is written to the secondary array 1004 in order and consistent. Synchronous replication is relatively unsuited to multiple site mirroring since each additional new site adds to the response time of the application.

Figure 10B:
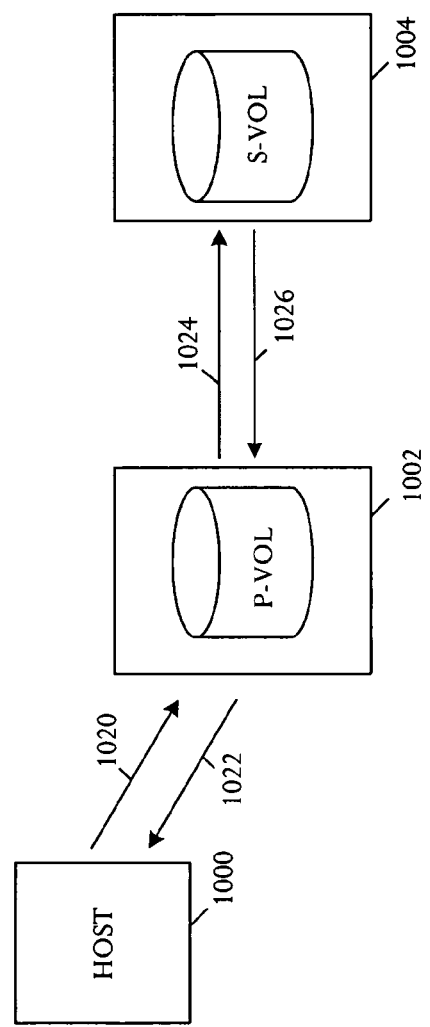

Referring to FIG. 10B, a schematic block diagram depicts an asynchronous data replication method with record ordering. An input/output command issued 1020 by the host 1000 to the primary storage array 1002 is immediately acknowledged 1022 to the host 1000 as soon as the command reaches the cache. A sequence number is added to the input/output command and sent 1024 to the secondary array 1004. Since the path to the secondary array 1004 can traverse any of multiple paths or routes, a possibility exists that the input/output commands can arrive out of order. The secondary array 1004 is responsible for reordering the incoming commands according to sequence number and applying data records in the correct sequence. Management by the secondary array 1004 ensures an in-order, consistent database, although the most current transactions can be lost in the event of a failure. Asynchronous data replication is better suited for long-distance replication since latency impact on the application host is reduced or eliminated.

In a particular example, the main control unit completes primary volume operations independently of the associated update copy operations at the secondary volume. The remote control unit manages the secondary volume updates according to the recordset information and maintains sequence ordered data consistency for the secondary volumes. If the primary volume write operation fails, the main control unit reports a unit check and does not create an asynchronous recordset for the operation. If the update copy operation fails, the remote control unit can optionally suspend either the affected pair or all pairs in a consistency group, depending on the type of failure. At resumption of the suspended pair, the main control unit and remote control unit can negotiate resynchronization of the pairs. The method for preserving logical object integrity in a remote mirror cache prevents an operation from leaving incorrect information on a secondary volume.

Figure 11:
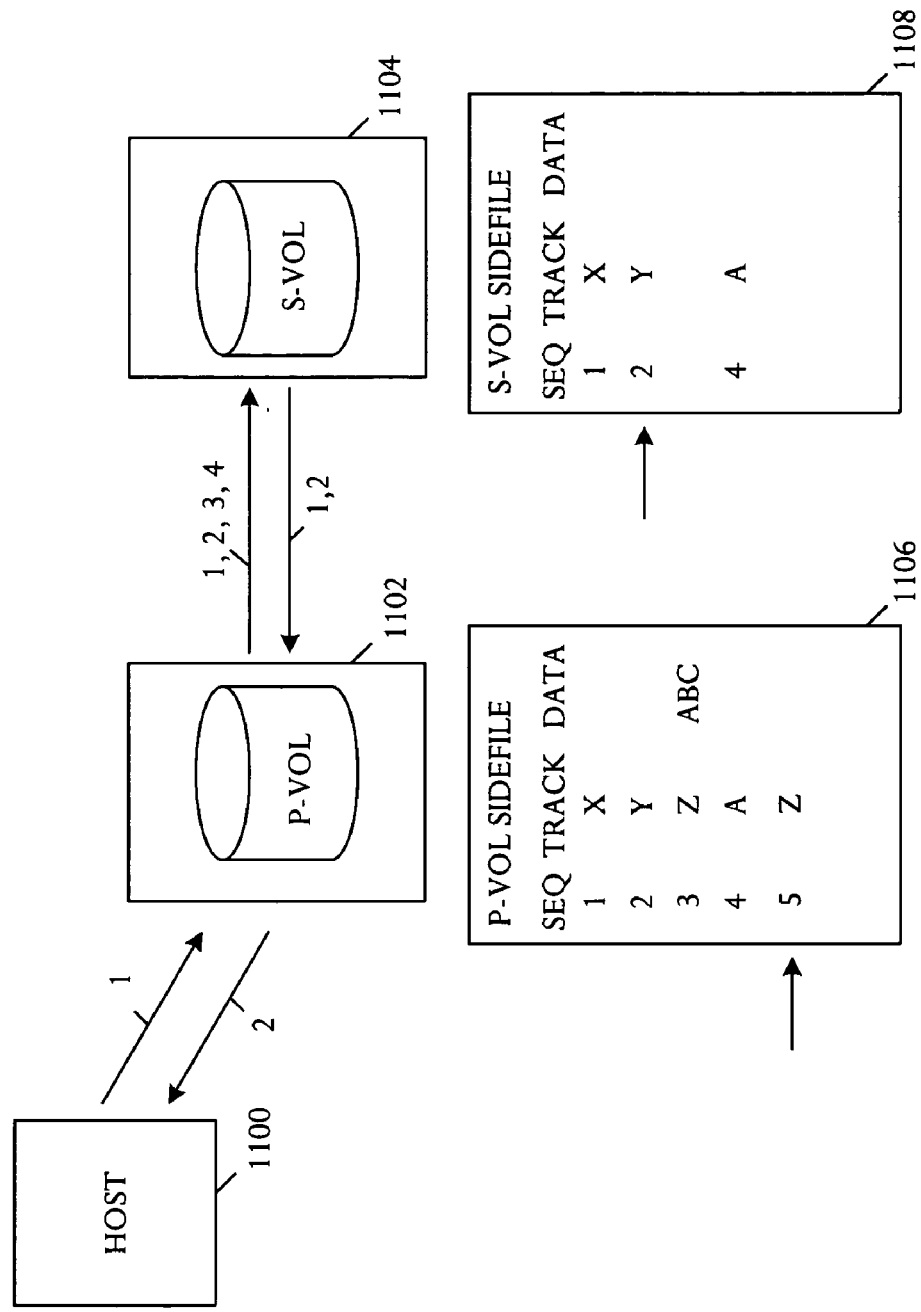
FIG. 11 is a schematic block diagram that illustrates sidefile usage in an embodiment of system capable of asynchronous data replication.

Referring to FIG. 11, a schematic block diagram illustrates sidefile usage in asynchronous data replication. Asynchronous replication uses sequence order tracking of update occurrence to ensure consistency. Tracking takes place in a primary volume sidefile 1106 and a secondary volume sidefile 1108. The individual updates are ordered with a sequence number and transmitted to the remote array 1104. When the remote array 1104 has received the next sequence number in the set, the remote array 1104 acknowledges receipt of the data according to sequence number to the primary array 1102 and the affected sequence number is removed from the primary volume sidefile list 1106. If a transaction is lost between the primary array 1102 and the secondary array 1104, retransmit of a specific sequence number's data can be requested.

The sequence of numbers is managed in memory of the primary array 1102 and the remote array 1104 and utilizes additional resources, the sidefiles 1106 and 1108. For an input/output operation performed to the primary array 1102, an entry is added to the sidefile 1106 containing the sequence number and a pointer to the blocks affected by the update. If the same block is updated on a subsequent input/output operation, contents of the block are also recorded in the sidefile 1106. The sidefile size is dependent on performance of the links to the remote array 1104 against the number of input/output operations performed by the primary array 1102. If the sidefile 1106 reaches a predetermined percentage of the total cache memory in the array 1102, for example if the input/output operations are backing up in the cache due to a slow link, the input/output rate from the host 1100 is restricted in an attempt to give higher priority to the sidefile 1106.

A sidefile is typically only used as long as a communication exists between the primary site 1102 and the secondary site 1104. If communication is disrupted, or pairs are suspended, overhead of a sidefile is considered to be too high so a bitmap is instead used to track changes, typically on a per-track or per-cylinder basis.

In various embodiments, the asynchronous recordsets can contain primary volume updates and associated control information, for example sequence number of the primary volume update to enable the remote control unit to maintain update consistency of the secondary volumes. Recordset operations can include creating and storing recordsets at the main control unit, sending recordsets to the remote control unit, storing recordsets in the remote control unit, and selecting and settling recordsets at the remote control unit. Other operations include controlling inflow for sidefiles.

In one example, upon a host-requested write input/output operation the main control unit performs an update and creates a recordset. The recordset can include the updated record, sequence number, record location such as device, cylinder, track, and record number, and record length. The recordsets can be queued in cache storage of the main control unit and sent to the remote control unit independent of host input/output processes. The remote control unit uses the sequence number in the recordsets to update the secondary volumes in the order of the primary volumes. The sequence number indicates the number of recordsets that the main control unit has created for each consistency group. Recordset information, other than updated records, is stored and queued in an area of cache known as sidefile cache.

In the example, the main control unit can send recordsets to the remote control unit by using main control unit initiator ports for issuing special input/output operations, called remote I/Os, to the remote control unit. The remote I/Os transfer recordsets efficiently using a single channel command so that the main control unit can send multiple recordsets in a single remote I/O call, even with noncontiguous sequence numbers. The remote control unit can store recordsets, maintaining queues to control storing of recordsets in the sidefile and commitment of updating records in the secondary volumes. Remote control unit queuing can use the sequence numbers to check for missing updates.

A bitmap table is an efficient technique to track changed records on a device from a particular point in time. Bit map tables record the changed track or cylinder number and typically do not maintain information concerning sequence or details of changes. During times of no communication between the primary site 1102 and secondary site 1104 or the pairs are suspended, a delta bit map table is maintained on both the primary 1102 and secondary 1104 arrays. Upon resynchronization of the pairs, only the changed cylinders are copied to the remote array 1104, bringing the data mirror up to date. Thereafter, a sidefile is again used to continue updates. During resynchronization, data on the remote array 1104 is inconsistent and unreliable.

Tracking of consistency groups is used to assure correct operation. An asynchronous consistency group is a user-defined set of volume pairs across which update sequence consistency is maintained and ensured at the remote site. Each asynchronous volume pair is assigned to a consistency group. In an illustrative system, the database system allows configuration of a predetermined number of consistency groups for each main control unit and supports group-based operations for the consistency groups. Consistency groups enable maintenance of update sequence consistency for databases that span multiple volumes, facilitating immediate database recovery at the remote site in the event of a failure or disaster.

An application commonly includes an aggregation of more than one physical device. Accordingly, correct operation can depend on assurance that all input/output activities are consistently applied to remote devices. During asynchronous operations, all devices in a device group form the same consistency group. Sequence numbers in a sidefile are issued at the consistency group granularity level so that input/output operations applied to the primary devices of that consistency group are applied to the secondary devices in the same sequence. If a device in the consistency group is not applied to be updated, the entire consistency group is placed into an error state. Consistency groups are defined and controlled so that writes to all devices in the consistency group are not destaged unless all prior writes are ready to be destaged. Consistency is applied to all devices in the consistency group, not simply a single LUN.

The method for preserving logical object integrity in a remote mirror cache can be used in the various remote copy operations of the database system, such as initial copy and update copy operations. An initial copy operation synchronizes the primary volumes and secondary volumes, generally independently of host processes. The initial copy typically takes place when a user adds a volume pair or resumes a split or suspended volume pair. When a new pair is created, the entire contents of the primary volume are copied to the secondary volume cylinder by cylinder, except for diagnostic and unassigned alternate tracks. Various database system embodiments may implement or omit usage of the method for preserving logical object integrity in a remote mirror cache for initial copy. Because initial copy generally occurs for more controlled conditions of database usage, some database system embodiments may omit the overhead associated with the method for preserving logical object integrity in a remote mirror cache for initial copy.

An update copy operation occurs when a host issues a write input/output operation to a primary volume of an established volume pair. The update copy operation duplicates the primary volume write input/output operation at the secondary volume to maintain volume pair synchrony. Usage of the method for preserving logical object integrity in a remote mirror cache is useful in update copying to assure correct database operations.

Figure 12:
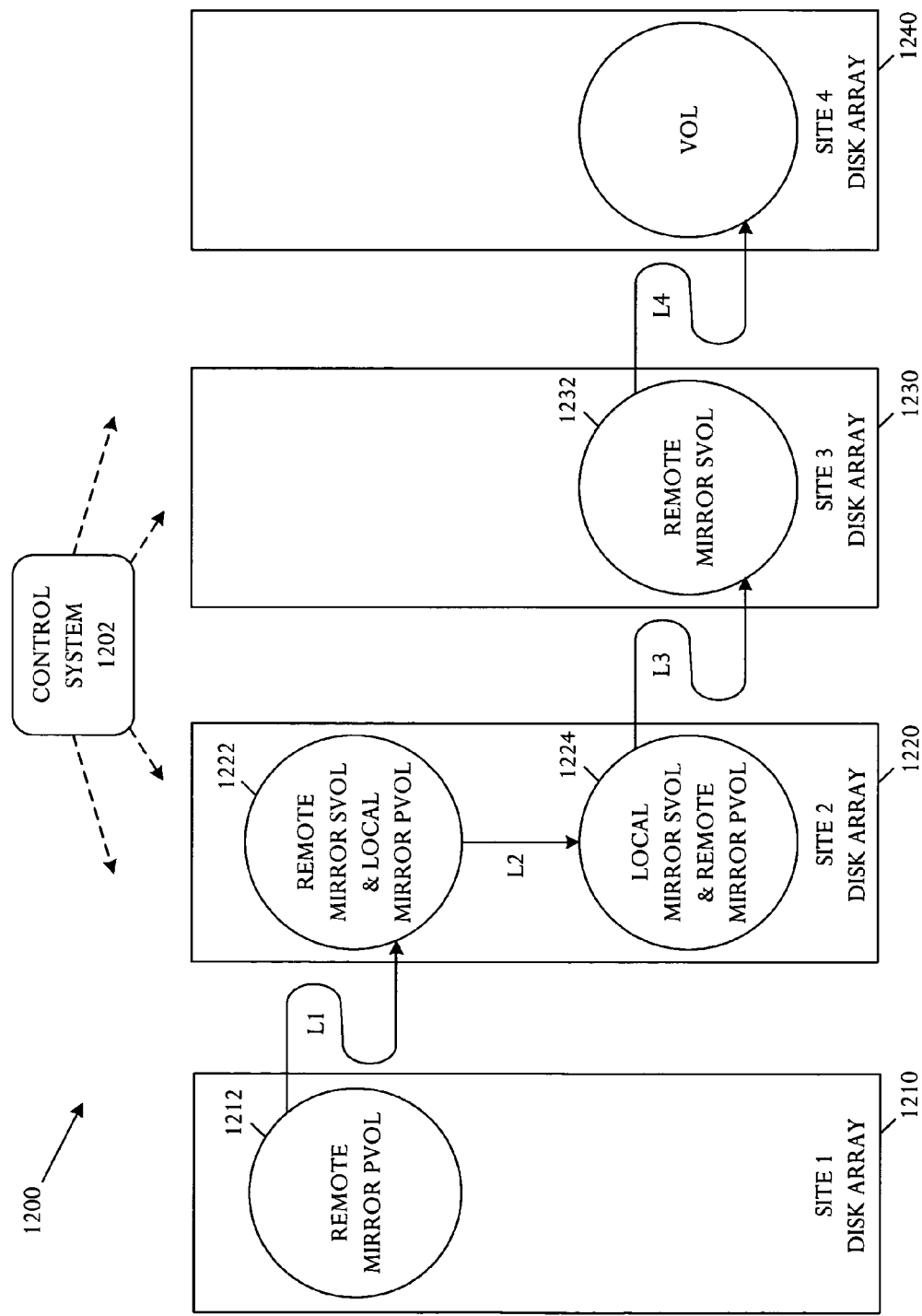
FIG. 12 is a schematic block diagram that depicts an example of a disaster recovery system including sequenced cascaded resynchronization.

Referring to FIG. 12, a schematic block diagram depicts an example of a disaster recovery system 1200 including sequenced cascaded resynchronization. The illustrative disaster recovery system 1200 comprises four or more disk arrays 1210, 1220, 1230, and 1240 in a configuration. The first disk array 1210 comprises remote mirror primary volume storage 1212. The second disk array 1220 comprises a remote mirror secondary volume and local mirror primary volume storage 1222 linked to the remote mirror primary volume storage 1212 by a first communication link L1. The second disk array 1220 also comprises a local mirror secondary volume and remote mirror primary volume storage 1224 internally mirror linked to the remote mirror secondary volume and local mirror primary volume storage 1222 by a second communication link L2 that is internal to the second disk array 1220. The third disk array 1230 comprises a remote mirror secondary volume storage 1232 linked to the second disk array local mirror secondary volume and remote mirror primary volume storage 1224 by a third communication link L3. The fourth disk array 1240 is linked to the remote mirror secondary volume storage 1232 by a fourth communication link L4. The disaster recovery system 1200 further comprises a distributed control system 1202 distributed and executable in the disk arrays that coordinates timing of data mirroring to promote consistency of the mirrored copies.

In other embodiments and configurations, the disk arrays may be variously arranged with multiple arrays contained in a single data center and connected by internal links, or arranged separately in data centers that have some degree of geographical remoteness.

A typical difficulty that the disaster recovery system 1200 avoids or alleviates is that the interior mirror link L2 can be either inconsistent while in a pair state or stale while in a suspend state if the data mirroring operations are not coordinated.

In some embodiments, the distributed control system 1202 controls the communication links and coordinates data mirroring operations using Meta commands.

Figure 13:
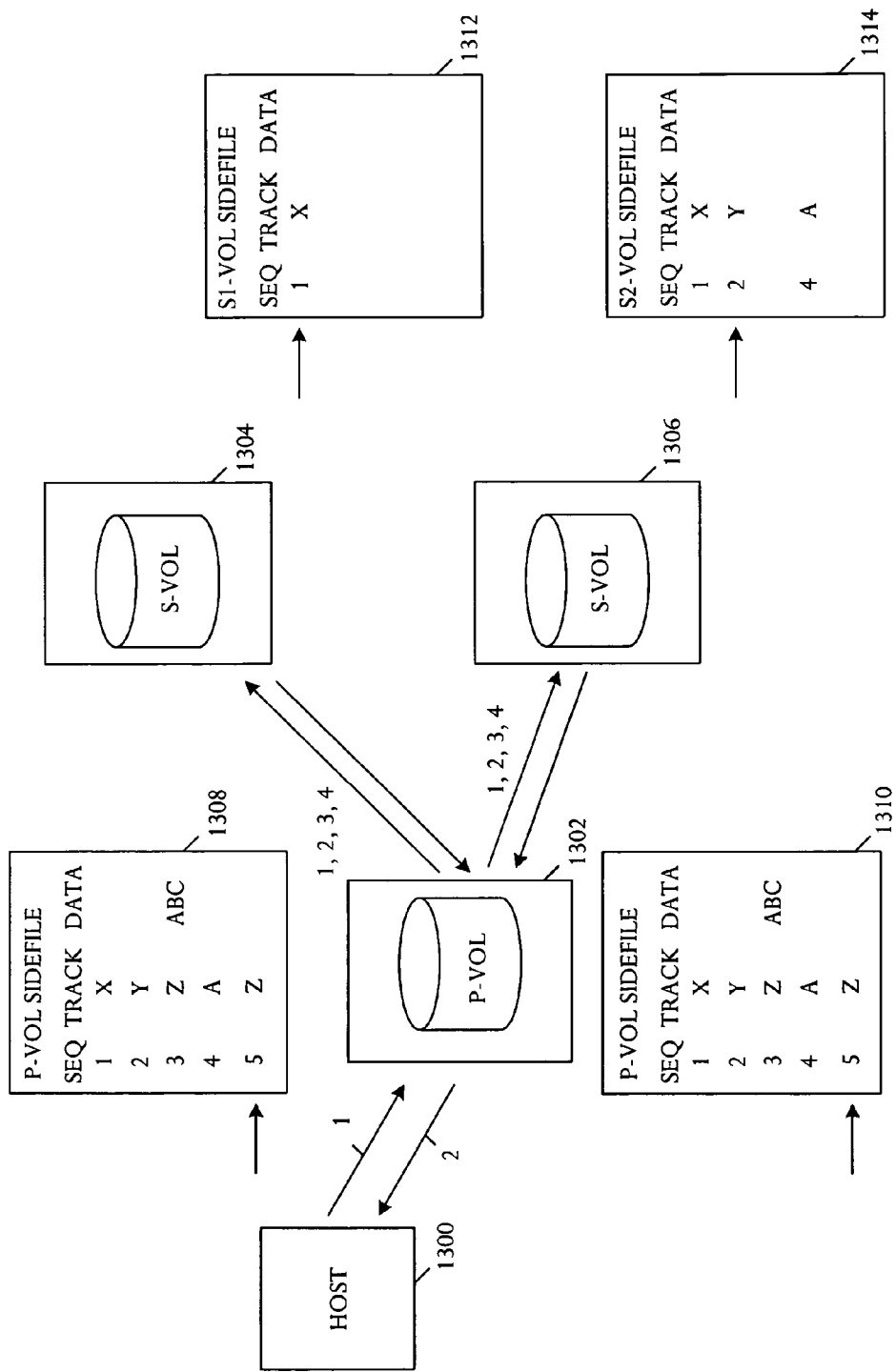
FIG. 13 is a schematic block diagram illustrating sidefile usage in an example configuration with a one-to-many relationship between primary and secondary volumes.

Referring to FIG. 13, a schematic block diagram illustrates sidefile usage in a configuration with a one-to-many relationship between primary and secondary volumes. In a particular example, the configuration can be implemented in a design using a Fibre Channel infrastructure. Asynchronous replication uses sequence order tracking of update occurrence to ensure consistency. Tracking takes place in two primary volume sidefiles 1308 and 1310, and two secondary volume sidefiles 1312 and 1314. An additional primary volume sidefile is added for each secondary site that is application for asynchronous replication.

Updates are ordered, for example by a host 1300, with a sequence number and transmitted to the remote disk volumes 1304 and 1306. When a remote disk volumes 1304, 1306 receives the next sequence number in a set, the remote disk volumes 1304, 1306 acknowledges receipt of the data according to sequence number to the primary disk volume 1302 and the affected sequence number is removed from a primary volume sidefile list 1308 and 1310. If a transaction is lost between the primary volume 1302 and one of the secondary volumes 1304, 1306, then retransmission of a specific sequence number's data can be requested.

The one-to-many configuration can be used for various cascaded configurations.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, the disclosed apparatus and technique can be used in any database configuration with any appropriate number of storage elements. Although, the database system discloses magnetic disk storage elements, any appropriate type of storage technology may be implemented. The system can be implemented with various operating systems and database systems. The control elements may be implemented as software or firmware on general purpose computer systems, workstations, servers, and the like, but may be otherwise implemented on special-purpose devices and embedded systems.

What is claimed is:

1. A mirroring device comprising:
a bridge that interfaces between first and second communication interfaces, the bridge being capable of simultaneous transmission to multiple storage devices including heterogeneous and disparate storage devices; and
a controller coupled to the bridge and capable of transparent, per write input/output, mirroring of information volumes to the multiple storage devices wherein:
the controller is capable of controlling anycast fuzzy data recovery mirrors wherein a controller operating at a primary node anycasts data to a predetermined list of nodes capable of receiving the anycast mirrored data with acknowledgement of the receiving nodes being untracked, and a controller operating at a mirror node receives the anycast data and sends an identical transmission to other mirror nodes in the predetermined list of nodes, a controller operating at a mirror node that receives multiple copies of the transmission disregarding the duplicate.

2. The mirroring device according to claim 1 further comprising:
a process executable on the controller that monitors and passes through non-mirrored read/write requests according to storage device addressing techniques.

3. The mirroring device according to claim 1 further comprising:
a process executable on the controller that is programmed in-band to selectively mirror and pass-through writes directed to a first address to also transfer to a second address.

4. The mirroring device according to claim 3 wherein:
the mirror and pass-through writes create a mirror selected from among a group including an internal mirror and a remote mirror.

5. The mirroring device according to claim 1 further comprising:
a memory;
a cache coupled to the memory;
at least one processor coupled to the cache and memory; and
a state controller, coupled to the at least one processor and controlling the mirroring device to perform synchronous and asynchronous mirroring to a plurality of mirrors.

6. The mirroring device according to claim 1 wherein:
the bridge interfaces to an internet Small Computer Systems Interface (iSCSI) and supports Internet Protocol Version 6 (IPv6) capabilities including unicast, multicast, anycast, Gig-E and 10Gig-E trunking, Internet Protocol Security (IPSec) encryption, Virtual Local Area Network (VLAN) for device grouping and zoning, and frame prioritization.

7. The mirroring device according to claim 1 wherein:
the controller can manage the storage devices according to definitions of standard target and logical unit (LUN) disk volumes without virtualization.

8. The mirroring device according to claim 1 wherein:
the controller can mirror volumes among at least two storage sites and can support fan-in and fan-out to a plurality of storage sites.

9. The mirroring device according to claim 1 further comprising:
a memory coupled to the controller; and
a process executable in the controller that stores and forwards information and manages multiple-hop disaster recovery configurations.

10. The mirroring device according to claim 1 further comprising:
a process executable in the controller that authenticates a sender and data contents.

11. The mirroring device according to claim 1 further comprising:
a process executable in the controller that selectively sends data in encrypted form and non-encrypted form.

12. The mirroring device according to claim 1 further comprising:
a process executable in the controller that confines write operations to a predefined Virtual Local Area Network (VLAN) group.

13. The mirroring device according to claim 1 wherein:
the controller operating at the mirror node receives the anycast data, tracks the received data by sequence number identification, detects missing data according to sequence number, and requests missing data from other nodes in the predetermined list of receiving nodes.

14. The mirroring device according to claim 1 further comprising:
a process executable in the controller that mirrors separate data sets asynchronously and synchronously using 1:1 fan-out per data set, 1:N per array via unicast communication to transparently create volume mirrors internally or remotely.

15. The mirroring device according to claim 1 further comprising:
a process executable in the controller that mirrors aggregated volume data sets asynchronously and synchronously to a plurality N of arrays using 1:N volumes per data set, 1:N per array via unicast communication, the volumes being aggregated at the mirror site.

16. The mirroring device according to claim 1 further comprising:
a process executable in the controller that mirrors aggregated volume data sets asynchronously and synchronously to a plurality N of arrays using 1:N volumes per data set, 1:N per array via unicast communication, the process determining when a remote write fails to complete and terminating mirroring to all remote mirror sites when one remote write fails.

17. The mirroring device according to claim 1 further comprising:
a process executable in the controller operating at a primary site that sends data to a plurality N of mirror sites in a disaster recovery configuration so that one host is duplicated N times.

18. The mirroring device according to claim 17 wherein:
the process can send data by unicast synchronous or asynchronous communication with duplicate writes sequentially to mirroring device at N remote mirror sites;
the process can send data by multicast synchronous or asynchronous communication with one write to a plurality of mirroring devices at N remote mirror sites; and
the process can sends data by anycast communication to the N mirror sites without awaiting or tracking receipt acknowledgements.

19. The mirroring device according to claim 1 further comprising:
a process executable in the controller that sends data using a multiple-hop disaster recovery configuration, the process executable at a primary site sending updates to a mirroring device at one destination site, the process executable at a mirror site receiving updates and relaying the updates to a subsequent mirroring device at one destination site.

20. The mirroring device according to claim 1 further comprising:
a process executable in the controller operating at a primary site that synchronously or asynchronously sends identical data to a plurality N of mirror sites in a disaster recovery configuration using unicast or multicast communication so that the same volume is mirrored to N different sites, the process determining when a remote write fails to complete and terminating mirroring to all remote mirror sites when one remote write fails.

21. A mirroring device comprising:
a bridge that translates protocol between first and second communication interfaces; and
a controller coupled to the bridge and capable of controlling anycast fuzzy data recovery mirrors wherein:
the controller, when operating as a primary node controller, anycasts data to a predetermined list of nodes capable of receiving the anycast mirrored data with acknowledgement of the receiving nodes being untracked;
the controller, when operating as a mirror node controller, receives the anycast data and sends an identical transmission to other mirror nodes in the predetermined list of nodes; and
the controller, when operating as a mirror node controller that receives multiple copies of the transmission, disregards the duplicates.

22. The mirroring device according to claim 21 wherein:
the controller, when operating as a mirror node controller, receives the anycast data, tracks the received data by sequence number identification, detects missing data according to sequence number, and requests missing data from other nodes in the predetermined list of receiving nodes.

23. The mirroring device according to claim 22 wherein:
the controller, when operating as a primary node controller, is capable of responding to loss of a primary volume by sending an anycast message to the predetermined list of mirror nodes that requests a status report for information relating to the lost primary volume.

24. The mirroring device according to claim 23 wherein:
the controller, when operating as a mirror node controller of the predetermined list of mirror nodes, responds to the status report request by replying with an identifier of the mirror node, designation of whether the data contained in the mirror node is consistent and usage, and identification of the last sequence number received.

25. The mirroring device according to claim 24 wherein:
the controller, when operating as a primary node controller, responds to the receipt of at least one status report by initiating a failover response that determines the mirror nodes containing usable information.

26. The mirroring device according to claim 25 wherein:
the controller, when operating as a primary node controller, responds to the receipt of at least one status report by initiating a failover response that determines the geographically closest of the mirror nodes containing usable information.

27. The mirroring device according to claim 21 further comprising:
a process executable in the controller that mirrors separate data sets asynchronously and synchronously using 1:1 fan-out per data set, 1:N per array via unicast communication to transparently create volume mirrors internally or remotely.

28. The mirroring device according to claim 21 further comprising:
a process executable in the controller that mirrors aggregated volume data sets asynchronously and synchronously to a plurality N of arrays using 1:N volumes per data set, 1:N per array via unicast communication, the volumes being aggregated at the mirror site.

29. The mirroring device according to claim 21 further comprising:
a process executable in the controller that mirrors aggregated volume data sets asynchronously and synchronously to a plurality N of arrays using 1:N volumes per data set, 1:N per array via unicast communication, the process determining when a remote write fails to complete and terminating mirroring to all remote mirror sites when one remote write fails.

30. The mirroring device according to claim 21 further comprising:
a process executable in the controller, when operating at a primary site, that sends data to a plurality N of mirror sites in a disaster recovery configuration so that one host is duplicated N times.

31. The mirroring device according to claim 30 wherein:
the process can send data by unicast synchronous or asynchronous communication with duplicate writes sequentially to mirroring device at N remote mirror sites;
the process can send data by multicast synchronous or asynchronous communication with one write to a plurality of mirroring devices at N remote mirror sites; and the process can send data by anycast communication to the N mirror sites without awaiting or tracking receipt acknowledgements.

32. The mirroring device according to claim 21 further comprising:
a process executable in the controller that sends data using a multiple-hop disaster recovery configuration, the process executable at a primary site sending updates to a mirroring device at one destination site, the process executable at a mirror site receiving updates and relaying the updates to a subsequent mirroring device at one destination site.

33. The mirroring device according to claim 21 further comprising:
a process executable in the controller operating at a primary site that synchronously or asynchronously sends identical data to a plurality N of mirror sites in a disaster recovery configuration using unicast or multicast communication so that the same volume is mirrored to N different sites, the process determining when a remote write fails to complete and terminating mirroring to all remote mirror sites when one remote write fails.

34. A mirroring device comprising:
a bridge that translates protocol between a plurality of communication interfaces; and
a controller coupled to the bridge and capable of controlling anycast fuzzy data recovery mirrors wherein:
a controller, when operating as a primary node controller, anycasts data to a predetermined list of nodes capable of receiving the anycast mirrored data with acknowledgement of the receiving nodes being untracked;
the controller, when operating as a mirror node controller, receives the anycast data, tracks the received data by sequence number identification, detects missing data according to sequence number, and requests missing data from other nodes in the predetermined list of receiving nodes; and
the controller, when operating as a mirror node controller, receives multiple copies of a transmission of the anycast data, and disregards any duplicate transmissions.

35. The mirroring device according to claim 34 wherein:
the controller, when operating as a primary node controller, is capable of responding to loss of a primary volume by sending an anycast message to the predetermined list of mirror nodes that requests a status report for information relating to the lost primary volume;
the controller, when operating as a mirror node controller of the predetermined list of mirror nodes, is capable of responding to the status report request by replying with an identifier of the mirror node, designation of whether the data contained in the mirror node is consistent and usage, and identification of the last sequence number received;
the controller, when operating as a primary node controller, is capable of responding to the receipt of at least one status report by initiating a failover response that determines the mirror nodes containing usable information; and
the controller, when operating as a primary node controller, is capable of responding to the receipt of at least one status report by initiating a failover response that determines the geographically closest of the mirror nodes containing usable information.

36. A method of mirroring data comprising:
translating protocol between first and second communication interfaces;
controlling a plurality of anycast fuzzy data recovery mirrors;
anycasting data from a primary site to a predetermined list of nodes capable of receiving the anycast mirrored data with acknowledgement of the receiving nodes being untracked; and
receiving the anycast data at a mirror node and sending an identical transmission to other mirror nodes in the predetermined list of nodes, the receipt of any duplicate data being disregarded.

37. The method according to claim 36 further comprising:
receiving the anycast data at a mirror node;
tracking the received data by sequence number identification;
detecting missing data according to sequence number; and
requesting missing data from other nodes in the predetermined list of receiving nodes.

38. The method according to claim 37 further comprising:
responding to loss of a primary volume at the primary site by sending an anycast message to the predetermined list of mirror nodes that requests a status report for information relating to the lost primary volume.

39. The method according to claim 38 further comprising:
responding to the status report request at a mirror site by replying with an identifier of the mirror node, designating whether the data contained in the mirror node is consistent and usage, and identifying the last sequence number received.

40. The method according to claim 36 further comprising:
mirroring separate data sets asynchronously and synchronously using 1:1 fan-out per data set, 1:N per array via unicast communication to transparently create volume mirrors internally or remotely.

41. The method according to claim 36 further comprising:
mirroring aggregated volume data sets asynchronously and synchronously to a plurality N of arrays using 1:N volumes per data set, 1:N per array via unicast communication, the volumes being aggregated at the mirror site.

42. The method according to claim 36 further comprising:
mirroring aggregated volume data sets asynchronously and synchronously to a plurality N of arrays using 1:N volumes per data set, 1:N per array via unicast communication;
determining when a remote write fails to complete; and
terminating mirroring to all remote mirror sites when one remote write fails.

43. The method according to claim 36 further comprising:
sending from a primary site data to a plurality N of mirror sites in a disaster recovery configuration so that one host is duplicated N times.

44. The method according to claim 36 further comprising:
sending data using a multiple-hop disaster recovery configuration;
sending from the primary site updates to a mirroring device at one destination site;
receiving at a mirror site updates and relaying the updates to a subsequent mirroring device at one destination site.

45. The method according to claim 36 further comprising:
synchronously or asynchronously sending from the primary site identical data to a plurality N of mirror sites in a disaster recovery configuration using unicast or multicast communication so that the same volume is mirrored to N different sites.

46. A mirroring device comprising:
means for translating protocol between first and second communication interfaces;

means for controlling a plurality of anycast fuzzy data recovery mirrors;

means for anycasting data from a primary site to a predetermined list of nodes capable of receiving the anycast mirrored data with acknowledgement of the receiving nodes being untracked; and means for receiving the anycast data at a mirror node and sending an identical transmission to other mirror nodes in the predetermined list of nodes, the receipt of any duplicate data being disregarded.

47. An article of manufacture comprising:

a non-transitory, computer-readable medium, usable by a controller, the computer-readable medium having a computable readable program code embodied therein for mirroring data, the computable readable program code further comprising:

a code capable of causing the controller to control a plurality of anycast fuzzy data recovery mirrors;

a code capable of causing the controller to anycast data from a primary site to a predetermined list of nodes capable of receiving the anycast mirrored data with acknowledgement of the receiving nodes being untracked;

a code capable of causing the controller to receive the anycast data at a mirror node and send an identical transmission to other mirror nodes in the predetermined list of nodes, the receipt of any duplicate data being disregarded.

* * * * *

UNITED STATES PATENT AND TRADEMARK OFFICE
CERTIFICATE OF CORRECTION

PATENT NO.       : 8,185,663 B2  
APPLICATION NO.  : 10/844478  
DATED            : May 22, 2012  
INVENTOR(S)      : Robert Cochran et al.

Page 1 of 1

It is certified that error appears in the above-identified patent and that said Letters Patent is hereby corrected as shown below:

In column 17, line 30, in Claim 18, delete "sends" and insert -- send --, therefor.

Signed and Sealed this
Eighteenth Day of December, 2012

David J. Kappos
*Director of the United States Patent and Trademark Office*